United States Patent
Li et al.

(10) Patent No.: US 11,086,423 B2
(45) Date of Patent: Aug. 10, 2021

(54) TOUCH DISPLAY DEVICE AND TOUCH DISPLAY SUBSTRATE FOR REDUCING SHEET RESISTANCE AND THICKNESS

(71) Applicants: Beijing BOE Technology Development Co., Ltd., Beijing (CN); BOE TECHNOLOGY GROUP CO., LTD., Beijing (CN)

(72) Inventors: Pan Li, Beijing (CN); Hui Li, Beijing (CN); Hongfei Cheng, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/840,819

(22) Filed: Apr. 6, 2020

(65) Prior Publication Data

US 2021/0124440 A1    Apr. 29, 2021

(30) Foreign Application Priority Data

Oct. 29, 2019    (CN) .......................... 201921830230.5

(51) Int. Cl.
*G06F 3/041*    (2006.01)
*G06F 3/045*    (2006.01)

(52) U.S. Cl.
CPC .... *G06F 3/041* (2013.01); *G06F 2203/04111* (2013.01)

(58) Field of Classification Search
CPC ...................... G06F 3/041; G06F 2203/04111
See application file for complete search history.

(56) References Cited

U.S. PATENT DOCUMENTS

| | | | |
|---|---|---|---|
| 2017/0115797 A1* | 4/2017 | Zheng | G02F 1/13338 |
| 2017/0160866 A1* | 6/2017 | Tsai | G06F 3/0412 |
| 2020/0004365 A1* | 1/2020 | Shin | G06F 3/04166 |
| 2020/0176478 A1* | 6/2020 | Wu | G06F 3/0412 |

* cited by examiner

*Primary Examiner* — Kwang-Su Yang
(74) *Attorney, Agent, or Firm* — Thomas | Horstemeyer, LLP (57) ABSTRACT

The present disclosure relates to a touch display substrate. The touch display substrate includes a substrate, data lines, a common electrode layer, first lead-wire lines, second lead-wire lines, a pixel electrode layer, and compensation electrode lines. Data lines are distributed at intervals on one side of the substrate along a row direction, and include first data lines and second data lines. The second lead-wires are connected to the second electrode blocks in columns. The pixel electrode layer includes a plurality of pixel electrodes distributed in an array, and two adjacent columns of the pixel electrodes are disposed on both sides of one of the data lines. The compensation electrode lines are disposed on the same layer as the pixel electrodes, and orthographic projections of the second data lines and the compensation electrode lines on the substrate overlap in one-to-one correspondence.

20 Claims, 4 Drawing Sheets

TOUCH DISPLAY DEVICE AND TOUCH DISPLAY SUBSTRATE FOR REDUCING SHEET RESISTANCE AND THICKNESS

CROSS-REFERENCE TO RELATED APPLICATION

This application claims the benefit of and priority to Chinese Patent Application No. 201921830230.5 filed on Oct. 29, 2019, the contents of which being incorporated by reference in their entirety herein.

TECHNICAL FIELD

The present disclosure relates to the field of touch display technologies and, in particular, to a touch display device and a touch display substrate.

BACKGROUND

At present, in-cell touch technology has been widely used. In a touch display panel using in-cell touch technology, a common electrode layer is usually divided into multiple electrode blocks, and the electrode blocks are connected to a touch chip through wirings so that the common electrodes can be driven in a time-division manner, and the common electrodes are multiplexed as touch electrodes. However, dividing the common electrode layer into multiple electrode blocks makes its sheet resistance large, thereby affecting the display effect.

It should be noted that the information disclosed in the Background section above is only for enhancing the understanding of the background of the present disclosure and thus, may include information that does not constitute prior art known to those of ordinary skill in the art.

SUMMARY

Embodiments of the present disclosure provide a touch display panel and a touch display substrate.

According to an aspect of the present disclosure, a touch display substrate is disposed and provided, the touch display substrate including:

a substrate;

a plurality of data lines distributed at intervals on one side of the substrate along a row direction, each of the data lines extending in a column direction, and each of the data lines comprising a first data line and a second data line;

a common electrode layer disposed on a side of the data lines facing away from the substrate and comprising a plurality of electrode blocks arranged in an array, wherein the electrode blocks comprise a plurality of columns of first electrode blocks and a plurality of columns of second electrode blocks arranged alternately in the row direction, and two adjacent columns of the electrode blocks are disposed on both sides of one of the data lines and separated by the one of the data lines;

a plurality of first lead-wires connected to the first electrode blocks in each row, respectively;

a plurality of second lead-wires connected to the second electrode blocks in each column, respectively, wherein the second lead-wires are insulated from the first lead-wires, and arranged directly opposite to the first data lines one to one;

a pixel electrode layer disposed on a side of the second lead-wires facing away from the substrate, and comprising a plurality of pixel electrodes arranged in an array, wherein two adjacent columns of the pixel electrodes are disposed on both sides of one of the data lines and separated by the one of the data lines; and a plurality of compensation electrode lines disposed on the same layer as the pixel electrodes, and disposed directly opposite to the second data lines one to one, wherein the compensation electrode lines are connected to the common electrode layer.

In an example embodiment of the present disclosure, the first lead-wires are disposed between the common electrode layer and the substrate, and the second lead-wires are disposed on one side of the common electrode layer facing away from the substrate.

In an example embodiment of the present disclosure, first electrode blocks in the same row are connected to the same first lead-wire through vias, and the same second lead-wire overlaps a surface of the second electrode blocks in the same column away from the substrate.

In an example embodiment of the present disclosure, the second electrode blocks in the same column are spaced apart from each other or formed as a single electrode.

In an example embodiment of the present disclosure, the compensation electrode lines comprise a plurality of segments of compensation units distributed at intervals along the column direction, and each of the compensation units is connected to the common electrode layer.

In an example embodiment of the present disclosure, each of the first lead-wires is disposed between two adjacent compensation units in the same column.

In an example embodiment of the present disclosure, first data lines and second data lines are alternately arranged.

In an example embodiment of the present disclosure, there are two first data lines between two adjacent second data lines; the touch display substrate further comprises sub-pixels corresponding to each of the pixel electrodes, and colors of the sub-pixels comprise red and blue, each of the compensation electrode lines is disposed between red and blue sub-pixels.

In an example embodiment of the present disclosure, orthographic projections of the electrode blocks on the pixel electrode layer cover a plurality of the pixel electrodes.

In an example embodiment of the present disclosure, the touch display substrate further includes:

a plurality of gate lines distributed at intervals on one side of the substrate close to the pixel electrode layer along the column direction, wherein two adjacent rows of the pixel electrodes are disposed on both sides of one of the gate lines and separated by the one of the gate lines.

In an example embodiment of the present disclosure, the touch display substrate further includes:

a gate disposed on the substrate in the same layer as the first lead-wires;

a gate insulation layer covering the gate and the substrate, wherein the data lines are disposed on a surface of the gate insulation layer facing away from the substrate;

an active layer disposed on a surface of the gate insulation layer facing away from the substrate;

a source-drain layer disposed on the surface of the gate insulation layer facing away from the substrate, and comprising a source and a drain connected to both sides of the active layer;

a passivation layer covering the source-drain layer, the active layer and the gate insulation layer, wherein the common electrode layer is disposed on a surface of the passivation layer away from the substrate, the second lead-wires are disposed on a surface of the common electrode layer facing away from the substrate, and the first electrode blocks are connected to the first lead-wires through the vias penetrating the passivation layer; and an interlayer insulation layer covering the common electrode layer and the second lead-wires, wherein the pixel electrodes and the compensation electrode lines are disposed on a surface of the interlayer insulation layer facing away from the substrate.

In an example embodiment of the present disclosure, two adjacent second lead-wires are connected.

According to an aspect of the present disclosure, a touch display device includes the touch display substrate according to any one of the above-described embodiments.

It should be noted that the above general description and the following detailed description are merely example and explanatory and should not be construed as limiting of the disclosure.

BRIEF DESCRIPTION OF THE DRAWINGS

The accompanying drawings, which are incorporated in the specification and constitute a part of the specification, show example embodiments of the present disclosure. The drawings along with the specification explain the principles of the present disclosure. It is understood that the drawings in the following description show only some of the embodiments of the present disclosure, and other drawings may be obtained by those skilled in the art without departing from the drawings described herein.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are disposed so that this disclosure will be more complete so as to convey the idea of the example embodiments to those skilled in this art. The same reference numerals in the drawings denote the same or similar parts, and the detailed description thereof will be omitted. In addition, the drawings are merely schematic representations of the present disclosure and are not necessarily drawn to scale.

Although the relative terms such as "above" and "below" are used in the specification to describe the relative relationship of one component to another component shown, these terms are only for convenience in this specification, for example, according to an example direction shown in the drawings. It will be understood that if the device shown is flipped upside down, the component described as "above" will become a component "below" another component. When a structure is "on" another structure, it may mean that a structure is integrally formed on another structure, or that a structure is "directly" disposed on another structure, or that a structure is "indirectly" disposed on another structure through other structures.

The terms "one," "a," "the," "said," and "at least one" are used to indicate that there are one or more elements, components, or the like. The terms "include," "contain," and "have" are used to indicate an open meaning of including and means that there may be additional elements, components, etc. in addition to the listed elements, components, etc. The terms "first," "second," "third," etc. are used only as markers, and do not limit the number of objects.

Now, with respect to the figures, reference numbers for various components of the figures include: 1, substrate; 2, data line; 21, first data line; 22, second data line; 3, common electrode layer; 31, electrode block; 311, first electrode block; 3111, via; 312, second electrode block; 4, first lead-wire; 5, second lead-wire; 6, compensation electrode line; 7, pixel electrode; 8, gate; 9, gate line; 10, gate insulation layer; 11, active layer; 12, passivation layer; 13, interlayer insulation layer; 14, source; and 15, drain.

An embodiment of the present disclosure provides a touch display substrate. As shown in FIGS. 1, 2, 5, and 6, the touch display substrate includes a substrate 1, data lines 2, a common electrode layer 3, first lead-wires 4, second lead-wires 5, a pixel electrode layer and a compensation electrode line 6.

The number of the data lines 2 is more than one, the data lines 2 are distributed at intervals on one side of the substrate 1 along a row direction, and each of the data lines 2 extends in a column direction. The plurality of data lines 2 include first data lines 21 and second data lines 22.

The common electrode layer 3 is disposed on a side of the data lines 2 facing away from the substrate 1. The common electrode layer 3 includes a plurality of electrode blocks 31 arranged in an array. Each electrode block 31 includes a first electrode block 311 and a second electrode block 312. The columns of first electrode blocks 311 and the columns of second electrode blocks 312 are alternately arranged in the row direction, and two adjacent electrode blocks 31 are disposed on both sides of one of the data lines 2.

The number of the first lead-wires 4 is more than one, and the first lead-wires 4 are in one-to-on correspondence to the rows of first electrode blocks 311, and are connected to the first electrode blocks 311 in respective rows. Each first lead-wire 4 can be independently connected to a control circuit so as to independently input a signal to each first lead-wire 4.

The number of the second lead-wires 5 is more than one, and the second lead-wires 5 are in one-to-on correspondence to the columns of second electrode blocks 312, and are connected to the second electrode blocks 312 in respective columns. Also, the second lead-wires 5 and the first lead-wires 4 are insulated from each other, and disposed directly opposite to the first data lines 21 one to one. Two adjacent second lead-wires 5 are connected and can be connected to the control circuit, and the same signal can be input to the two adjacent second lead-wires 5.

The pixel electrode layer is disposed on a side of the second lead-wires 5 facing away from the substrate 1. The pixel electrode layer includes a plurality of pixel electrodes 7 arranged in an array, and two adjacent columns of pixel electrodes 7 are disposed on both sides of one of the data lines 2 and are separated by the one of the data lines 2.

The number of the compensation electrode lines 6 is more than one, and the compensation electrode lines 6 are disposed on the same layer as the pixel electrodes 7 and disposed directly opposite to the second data lines 22 one to one. Also, the compensation electrode lines 6 are connected to the common electrode layer 3.

In the touch display substrate of the present disclosure, in a time-division multiplexing manner, the first lead-wires 4 and the first electrode blocks 311 connected by the first lead-wires can be reused as the first touch electrodes (in other words, the first lead-wires 4 and the first electrode blocks 311 connected by the first lead-wires can function to receive common electrode signals in a display phase, and can function to receive touch sensing signals in a touch sensing phase), and the second lead-wires 5 and the second electrode blocks 312 connected by the second lead-wires 5 can be reused as the second touch electrodes (in other words, the second lead-wires 5 and the second electrode blocks 312 connected by the second lead-wires 5 can function to receive common electrode signals in a display phase, and can function to receive touch sensing signals in a touch sensing phase). Accordingly, the touch function is realized through the cooperation of the first touch electrodes and the second touch electrodes. A common voltage signal can also be input to the common electrode layer through the first lead-wires 4 and the second lead-wires 5 to implement the display function.

In addition, because the compensation electrode lines 6 are disposed on the same layer as the pixel electrodes 7, and disposed directly opposite to the second data lines 22, and are connected to the common electrode layer 3, so that the sheet resistance can be reduced, and the area between the pixel electrodes 7 are utilized to avoid increase of the thickness and preventing the touch function from being affected.

It should be noted that the row direction and the column direction in the present disclosure only indicate two different directions that intersect with each other. Although the current perspectives in the drawings are horizontal and vertical, respectively, it does not mean that in actual products, the row direction is necessarily the horizontal direction, and the column direction is necessarily the vertical direction.

The touch display substrate of the embodiment of the present disclosure is described in detail below.

Figure 1:
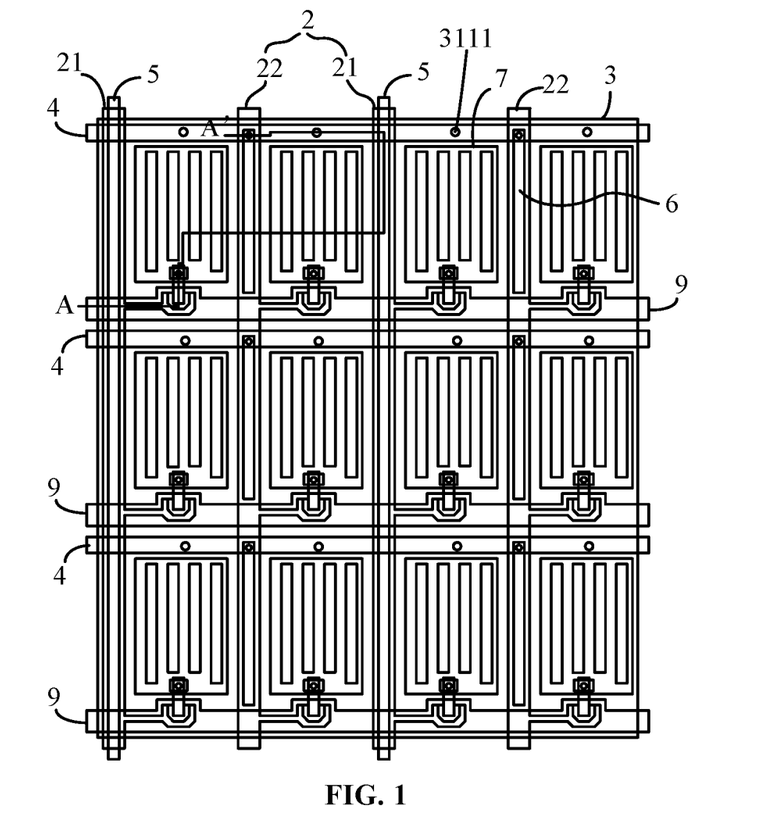
FIG. 1 is a schematic diagram of a touch display substrate according to an embodiment of the present disclosure.
Figure 2:
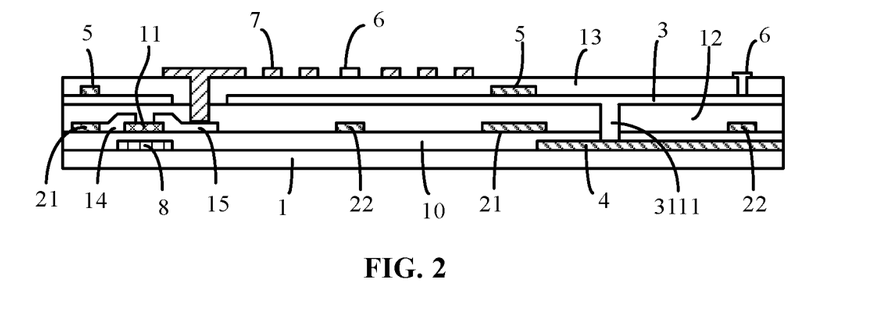
FIG. 2 is a cross-sectional view of the touch display substrate in FIG. 1 along line AA'.

As shown in FIG. 1 and FIG. 2, the data lines 2 may be distributed at intervals along the row direction, and extend along the column direction. The number of the first data lines 21 and the second data lines 22 in the data lines 2 is not particularly limited here, and the first data lines 21 and the second data lines 22 can be alternately arranged in the row direction. That is, in every two adjacent data lines 2, one is a first data line 21, the other is a second data line 22. Of course, data lines can also be arranged in other ways. For example, there is a plurality of second data lines 22 between two adjacent first data lines 21.

The positions of the first data lines 21 and the second data lines 22 are different, and they may have the same or different structures. Specifically, the first data lines 21 are the data lines 2 that are disposed directly opposite to the second lead-wires 5. That is to say, the orthographic projections of the first data lines 21 and the second lead-wires 5 on the substrate 1 overlap in one-to-one correspondence, but orthographic projections of the first data lines 21 and the second lead-wires 5 on the substrate 1 may not completely overlap with each other. The second data lines 22 are data lines 2 other than the first data lines 21.

As shown in FIG. 1, FIG. 2, FIG. 5, and FIG. 6, in the common electrode layer 3, the specific number of the electrode blocks 31 is not particularly limited herein, and the electrode blocks 31 are arranged in an array with multiple rows and multiple columns. The plurality of electrode blocks 31 include first electrode blocks 311 and second electrode blocks 312. In the row direction, the first electrode blocks 311 and the second electrode blocks 312 are alternately arranged. The first electrode blocks 311 are arranged in multiple columns. The second electrode blocks 312 are arranged in multiple columns. The first electrode blocks 311 in each column as a whole and the second electrodes in each column are alternately arranged in the row direction. Also, two adjacent columns of electrode blocks 31 are disposed on both sides of one of the data lines 2 and separated by the one of the data lines 2.

Figure 5:
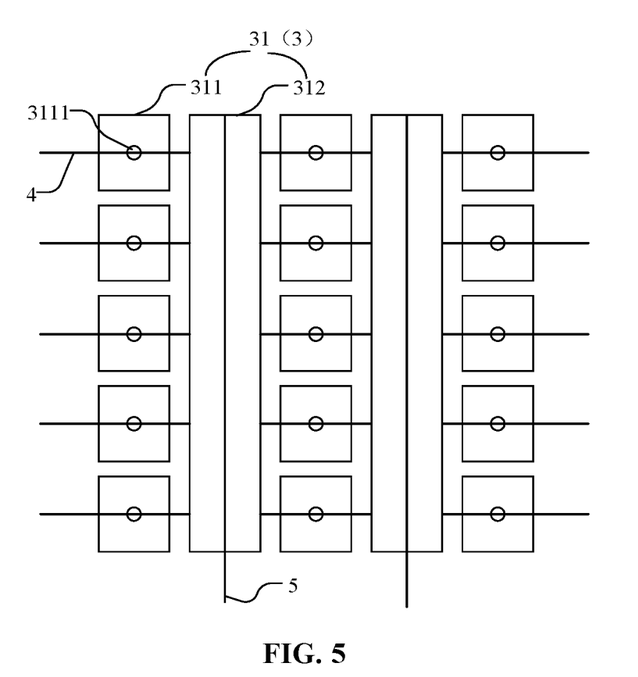
FIG. 5 is a schematic diagram showing distribution of first electrode blocks and second electrode blocks of a touch display substrate according to an embodiment of the present disclosure.
Figure 6:
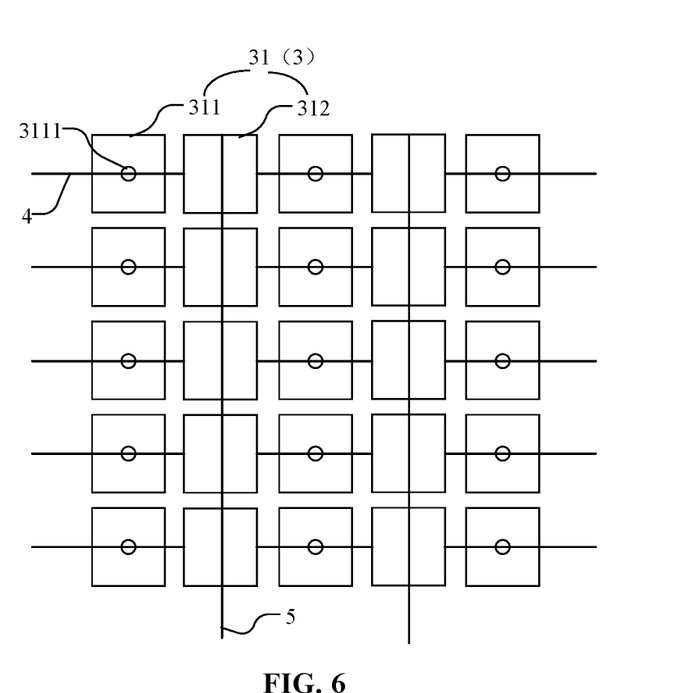
FIG. 6 is a schematic diagram showing distribution of first electrode blocks and second electrode blocks in a touch display substrate according to an embodiment of the present disclosure.

The first electrode blocks 311 in each row are connected by the same first lead-wire 4, and the first electrode blocks 311 in different rows are connected by different first lead-wires 4, so that the first electrode blocks 311 in each row can be reused as first touch electrodes.

As shown in FIG. 1 and FIG. 2, the second lead-wires 5 in each column are connected by the same second lead-wire 5, and the first electrode blocks 311 in different columns are connected by different second lead-wires 5, so that the second electrode blocks 312 in each column can be reused as a second touch electrode. Also, the second lead-wires 5 and the first lead-wires 4 are insulated from each other, and the second lead-wires 5 and the first data lines 21 are disposed directly opposite to each other, that is, each second lead-wire 5 is disposed directly opposite to one first data line 21. In other words, the orthographic projections of the first data lines 21 and the second lead-wires 5 on the substrate 1 overlap in one-to-one correspondence, but the orthographic projections of the first data lines 21 and the second lead-wires 5 on the substrate 1 are not necessarily completely overlap with each other.

Further, the first lead-wires 4 are disposed between the common electrode layer 3 and the substrate 1, and the second lead-wires 5 are disposed on a side of the common electrode layer 3 facing away from the substrate 1, so that the first lead-wires 4 and the second lead-wires 5 are located in different film layers to achieve the insulation between the first lead-wires 4 and the second lead-wires 5. For example, as shown in FIG. 5 and FIG. 6, the first electrode blocks 311 in the same row are connected to the same first lead-wire 4 through vias 3111. The first lead-wires 4 cross the second electrode blocks 312 on the side of the second electrode blocks 312 close to the substrate 1, but are not connected to the second electrode blocks 312. The same second lead-wire 5 is overlapped over the surface of the second electrode blocks 312 in the same column facing away from the substrate 1, thereby connecting the second electrode blocks 312 in the same column.

In addition, as shown in FIG. 5, the second electrode blocks 312 in the same column may be formed as a single electrode, and under such condition, the second electrode blocks 312 in the same column are different regions of the single electrode bar; or, as shown in FIG. 6, the second electrode blocks 312 in the same column may be a plurality of independent electrode blocks 31 disposed at intervals.

Figure 3:
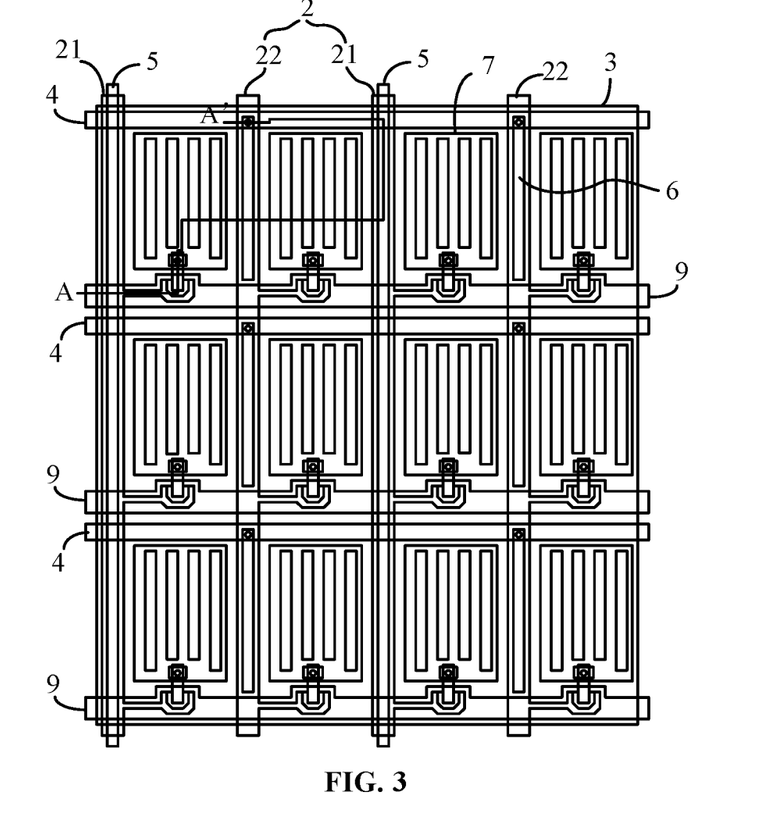
FIG. 3 is a schematic diagram of a touch display substrate according to an embodiment of the present disclosure.
Figure 4:
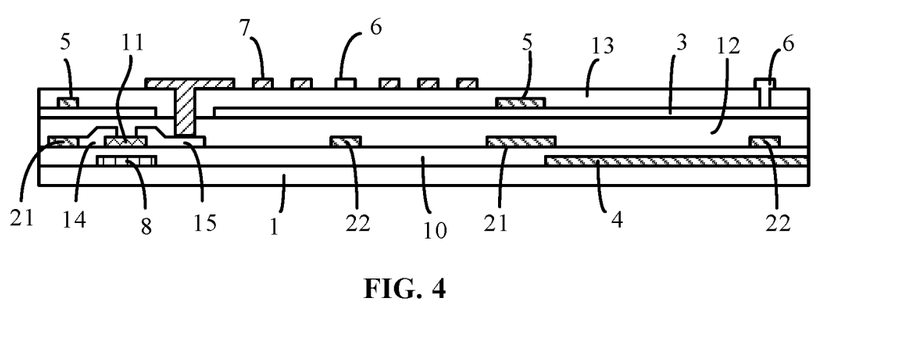
FIG. 4 is a cross-sectional view of the touch display substrate in FIG. 3 along line AA'.

It should be noted that FIG. 1 and FIG. 2 show that the first electrode blocks are connected to the first lead-wires 4 through the vias 3111, and the reference numeral 3 in FIG. 2 refers to the first electrode blocks of the common electrode layer 3. FIG. 3 and FIG. 4 do not show that the first electrode blocks are connected to the first lead-wires 4 through the vias, and the reference numeral 3 in FIG. 4 refers to the second electrode blocks of the common electrode layer 3 or other areas of the common electrode layer 3. That is, the structures of the blocks in FIGS. 1 and 2 do not necessarily the same as the electrode blocks in FIGS. 3 and 4, and the cross-sectional position are not necessarily the same.

As shown in FIGS. 1 and 2, a pixel electrode layer is disposed on a side of the second lead-wires 5 facing away from the substrate 1, and is opposite to the common electrode layer 3. The pixel electrode layer includes a plurality of pixel electrodes 7 distributed in an array. Each pixel electrode 7 is included in a sub-pixel, and two adjacent columns of pixel electrodes 7 are disposed on both sides of one of the data lines 2. The pixel electrodes 7 may be slit electrodes, comb electrodes, or the like, and the shape and structure of the pixel electrodes 7 are not particularly limited herein. In addition, each first lead-wire 4 separates two adjacent rows of pixel electrodes 7.

For example, there are two first data lines 21 between two adjacent second data lines 22, and the touch display substrate further includes sub-pixels each corresponding to each pixel electrode 7, so that there are two first data lines 21 between two adjacent compensation electrode lines 6. The colors of the sub-pixels include red and blue, and may also include green to form RGB pixel structures. Each compensation electrode line 6 may be disposed between a red sub-pixel and a blue sub-pixel.

The number of electrode blocks 31 is less than the number of pixel electrodes 7. The orthographic projection of any electrode block 31 on the pixel electrode layer covers a plurality of pixel electrodes 7, that is, the same electrode block 31 is disposed to correspond to a plurality of pixel electrodes 7 simultaneously. The number of pixel electrodes 7 corresponding to each electrode block 31 is the same. Alternatively, the number of the electrode blocks 31 is the same as the number of the pixel electrodes 7. The orthographic projections of the electrode blocks 31 on the pixel electrode layer covers each of the pixel electrodes 7 in one-to-one correspondence, that is, the electrode blocks 31 and the pixel electrodes 7 are arranged in one-to-one correspondence.

As shown in FIG. 1 and FIG. 2, each compensation electrode line 6 and each second data line 22 are disposed directly opposite to each other, that is, the orthographic projections of the second data lines 22 and the compensation electrode lines 6 on the substrate 1 overlap in one-to-one correspondence, but the orthographic projections of the second data lines 22 and the compensation electrode lines 6 on the substrate 1 do not necessarily completely overlap with each other. Each compensating electrode line 6 is connected to a corresponding electrode block 31, and may also be connected to a first lead-wire 4 as long as it can be connected to the common electrode layer 3. The gap between two adjacent columns of electrode blocks 31 corresponding to the second data lines 22 corresponds to the gap between the second data lines 22, which can be compensated by the compensation electrode lines 6, thereby reducing the sheet resistance of the common electrode layer 3 and improving the display effect.

In addition, the compensation electrode lines 6 and the pixel electrodes 7 are disposed on the same layer and can be formed by one patterning process. For example, the compensation electrode lines 6 and the pixel electrodes 7 can be formed through the same patterning process, which facilitates to simplify the process and avoids increase of the thickness of the entire touch display substrate caused by setting the compensation electrode lines 6.

Each of the compensation electrode lines 6 may include a plurality of segments of compensation units spaced along the column direction, and each compensation unit is connected to the common electrode layer 3. Further, each first lead-wire 4 is disposed between two adjacent compensation units in the same column.

As shown in FIG. 1 and FIG. 2, the touch display substrate of the present disclosure may further include a plurality of thin film transistors arranged in an array, and each thin film transistor is connected to each pixel electrode 7 in the one-to-one correspondence so as to drive each sub-pixel to display image. The thin film transistor may be a bottom gate or a top gate structure.

In one embodiment, for example, the thin film transistor has a bottom-gate structure. The touch display substrate of the present disclosure further includes a gate 8, gate lines 9, a gate insulation layer 10, an active layer 11, a source-drain layer, a passivation layer 12 and an interlayer insulation layer 13.

The gate 8 and the first lead-wires 4 may be disposed on the substrate 1, and both may be formed by using the same material, so that they can be formed by one patterning process.

The gate insulation layer 10 covers the gate 8 and the substrate 1, and the data lines 2 are disposed on a surface of the gate insulation layer 10 facing away from the substrate 1.

The active layer 11 is disposed on a surface of the gate insulation layer 10 facing away from the substrate 1.

The source-drain layer is disposed on a surface of the gate insulation layer 10 facing away from the substrate 1. The source-drain layer includes a source 14 and a drain 15, and the source 14 and the drain 15 are connected to both sides of the active layer 11.

The passivation layer 12 covers the source-drain layer, the active layer 11, and the gate insulation layer 10. The common electrode layer 3 is disposed on a surface of the passivation layer 12 facing away from the substrate 1. The second lead-wires 5 are disposed on a surface of the common electrode layer 3 facing away from the substrate 1. The first electrode blocks 311 are connected to the first lead-wires 4 through the vias 3111 penetrating the passivation layer 12.

The interlayer insulation layer 13 covers the common electrode layer 3 and the second lead-wires 5. The pixel electrodes 7 and the compensation electrode lines 6 are disposed on a surface of the interlayer insulation layer 13 facing away from the substrate 1.

As shown in FIG. 1 and FIG. 2, the touch display substrate according to the embodiment of the present disclosure further includes a plurality of gate lines 9, and the gate lines 9 are distributed at intervals on a side of the substrate 1 close to the pixel electrode layer along the column direction. Two adjacent rows of pixel electrodes 7 are disposed on both sides of one of the gate lines 9. Further, the gate lines 9 may be disposed in the same layer as the gate 8 and the first lead-wires 4, and the gates 8 of the thin film transistors in the same row are connected through the same gate line 9.

An embodiment of the present disclosure further provides a touch display device including the above-mentioned touch display substrate. The touch display device can be used in a terminal device such as a mobile phone or a tablet computer. For the beneficial effects, please refer to the beneficial effects of the above touch display panel, which will not be repeated here.

Other embodiments of the present disclosure will be apparent to those skilled in the art after those skilled in the art consider the specification and practice the technical solutions disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A touch display substrate, comprising:
   a substrate;
   a plurality of data lines distributed at intervals on one side of the substrate along a row direction, each of the data lines extending in a column direction, and each of the data lines comprising a first data line and a second data line;
   a common electrode layer disposed on a side of the data lines facing away from the substrate and comprising a plurality of electrode blocks arranged in an array, wherein the electrode blocks comprise a plurality of columns of first electrode blocks and a plurality of columns of second electrode blocks arranged alternately in the row direction, and two adjacent columns of the electrode blocks are disposed on both sides of one of the data lines and separated by the one of the data lines;
   a plurality of first lead-wires connected to the first electrode blocks in each row, respectively;
   a plurality of second lead-wires connected to the second electrode blocks in each column, respectively, wherein the second lead-wires are insulated from the first lead-wires, and orthographic projections of the first data lines and the second lead-wires on the substrate overlap in one-to-one correspondence;
   a pixel electrode layer disposed on a side of the second lead-wires facing away from the substrate, and comprising a plurality of pixel electrodes arranged in an array, wherein two adjacent columns of the pixel electrodes are disposed on both sides of one of the data lines and separated by the one of the data lines; and
   a plurality of compensation electrode lines disposed on the same layer as the pixel electrodes, wherein orthographic projections of the second data lines and the compensation electrode lines on the substrate overlap in one-to-one correspondence and the compensation electrode lines are connected to the common electrode layer.

2. The touch display substrate according to claim 1, wherein the first lead-wires are disposed between the common electrode layer and the substrate, and the second lead-wires are disposed on one side of the common electrode layer facing away from the substrate.

3. The touch display substrate according to claim 2, wherein:
   the first electrode blocks in the same row are connected to the same first lead-wire through vias; and
   the same second lead-wire overlaps a surface of the second electrode blocks in the same column away from the substrate.

4. The touch display substrate according to claim 2, wherein the compensation electrode lines comprise a plurality of segments of compensation units distributed at intervals along the column direction, and each of the compensation units is connected to the common electrode layer.

5. The touch display substrate according to claim 4, wherein each of the first lead-wires is disposed between two adjacent compensation units in the same column.

6. The touch display substrate according to claim 2, wherein the touch display substrate further comprises:
   a gate disposed on the substrate in the same layer as the first lead-wires;
   a gate insulation layer covering the gate and the substrate, wherein the data lines are disposed on a surface of the gate insulation layer facing away from the substrate;
   an active layer disposed on a surface of the gate insulation layer facing away from the substrate;
   a source-drain layer disposed on the surface of the gate insulation layer facing away from the substrate, and comprising a source and a drain connected to both sides of the active layer;
   a passivation layer covering the source-drain layer, the active layer and the gate insulation layer, wherein the common electrode layer is disposed on a surface of the passivation layer away from the substrate, the second lead-wires are disposed on a surface of the common electrode layer facing away from the substrate, and the first electrode blocks are connected to the first lead-wires through the vias penetrating the passivation layer; and
   an interlayer insulation layer covering the common electrode layer and the second lead-wires, wherein the pixel electrodes and the compensation electrode lines are disposed on a surface of the interlayer insulation layer facing away from the substrate.

7. The touch display substrate according to claim 1, wherein the second electrode blocks in the same column are spaced apart from each other or formed as a single electrode.

8. The touch display substrate according to claim 1, wherein first data lines and second data lines are alternately arranged.

9. The touch display substrate according to claim 1, further comprising two first data lines between two adjacent second data lines,
   wherein the touch display substrate further comprises sub-pixels corresponding to each of the pixel electrodes, colors of the sub-pixels comprise red and blue, and each of the compensation electrode lines is disposed between red and blue sub-pixels.

10. The touch display substrate according to claim 1, wherein orthographic projections of the electrode blocks on the pixel electrode layer cover a plurality of the pixel electrodes.

11. The touch display substrate according to claim 1, wherein the touch display substrate further comprises:
   a plurality of gate lines distributed at intervals on one side of the substrate close to the pixel electrode layer along the column direction, wherein two adjacent rows of the pixel electrodes are disposed on both sides of one of the gate lines and separated by the one of the gate lines.

12. The touch display substrate according to claim 1, wherein two adjacent second lead-wires are connected.

13. A touch display device, comprising a touch display substrate, wherein the touch display substrate comprises:
   a substrate;
   a plurality of data lines distributed at intervals on one side of the substrate along a row direction, each of the data lines extending in a column direction, and each of the data lines comprising a first data line and a second data line;
   a common electrode layer disposed on a side of the data lines facing away from the substrate and comprising a plurality of electrode blocks arranged in an array, wherein the electrode blocks comprise a plurality of columns of first electrode blocks and a plurality of columns of second electrode blocks arranged alternately in the row direction, and two adjacent columns of the electrode blocks are disposed on both sides of one of the data lines and separated by the one of the data lines;

a plurality of first lead-wires connected to the first electrode blocks in each row, respectively;

a plurality of second lead-wires connected to the second electrode blocks in each column, respectively, wherein the second lead-wires are insulated from the first lead-wires, and orthographic projections of the first data lines and the second lead-wires on the substrate overlap in one-to-one correspondence;

a pixel electrode layer disposed on a side of the second lead-wires facing away from the substrate, and comprising a plurality of pixel electrodes arranged in an array, wherein two adjacent columns of the pixel electrodes are disposed on both sides of one of the data lines and separated by the one of the data lines; and a plurality of compensation electrode lines disposed on the same layer as the pixel electrodes, wherein orthographic projections of the second data lines and the compensation electrode lines on the substrate overlap in one-to-one correspondence and the compensation electrode lines are connected to the common electrode layer.

14. The device according to claim 13, wherein the first lead-wires are disposed between the common electrode layer and the substrate, and the second lead-wires are disposed on one side of the common electrode layer facing away from the substrate.

15. The device according to claim 14, wherein:

the first electrode blocks in the same row are connected to the same first lead-wire through vias; and the same second lead-wire overlaps a surface of the second electrode blocks in the same column away from the substrate.

16. The device according to claim 14, wherein the compensation electrode lines comprise a plurality of segments of compensation units distributed at intervals along the column direction, and each of the compensation units is connected to the common electrode layer.

17. The device according to claim 16, wherein each of the first lead-wires is disposed between two adjacent compensation units in the same column.

18. The device according to claim 13, wherein the second electrode blocks in the same column are spaced apart from each other or formed as a single electrode.

19. The device according to claim 13, wherein first data lines and second data lines are alternately arranged.

20. The device according to claim 13, further comprising two first data lines positioned between two adjacent second data lines, wherein the touch display substrate further comprises sub-pixels corresponding to each of the pixel electrodes, colors of the sub-pixels comprise red and blue, and each of the compensation electrode lines is disposed between red and blue sub-pixels.

* * * * *